United States Patent Office 3,567,417
Patented Mar. 2, 1971

3,567,417
NOZZLE FOR DRAWING CORD-FREE PLATE GLASS
Ernst Winter, Weiden, Upper Palatinate, Germany, assignor to Flachglas-Aktiengesellschaft Delog-Detag, Furth, Bavaria, Germany
Filed July 10, 1968, Ser. No. 743,846
Claims priority, application Germany, Dec. 20, 1967,
D 54,908
Int. Cl. C03b 15/02
U.S. Cl. 65—193          2 Claims

ABSTRACT OF THE DISCLOSURE

A nozzle for drawing cord-free plate glass, comprising a chamotte nozzle body having a straight slot extending essentially the entire width of the nozzle body and tapered at both its ends, through which slot the molten glass is extracted for drawing, and liner inserts secured in said body and conformed to the shape of the nozzle slot and extending over its entire useful length. The inserts have a wedge-shaped cross-section and are lodged in a correspondingly shaped portion of a recess in the body to prevents any lifting-off of the liner inserts, the liner inserts being constituted of sintered molybdenum disilicide.

BRIEF SUMMARY OF THE INVENTION

The invention relates to a nozzle for drawing plate glass free of cords, especially for the Fourcault process, wherein the nozzle body is provided with a straight slot extending essentially over its entire width and tapered at its ends, the molten glass being extracted through said slot for drawing.

The nozzles generally used up to the present time for drawing of plate glass, consist of chamotte. The configuration and design of such nozzles has gradually been refined over the years with regard to their inflow port, their surfaces forming the nozzle slot, as well as their adjacent nozzle beam, whereby the drawing of plate glass has thus been gradually improved.

Nozzles of chamotte, however, due to their chemical and physical behavior towards the molten glass, as well as to their mechanical nature, present fault sources which show up in the ribbon of drawn glass as cords, threads, etc. By cords are meant fine strippings inside the plate glass, which can be seen at a very narrow angle, and the cause of which is corrosion of the chamotte material of the nozzle by the action of the molten glass.

Also known are nozzles of metal, including the use of precious metal platings in the lip area of the nozzle for drawing plate glass by the Fourcault process. The construction of such nozzles is complicated and expensive and hence is not suitable for general industrial purposes. It has also been attempted to make the entire nozzle of a material having a high content of alum earth. The making of such nozzles, as well as their handling in operation, are fraught with such extraordinary difficulties that they have failed to be used in practice.

In our earlier patent application, Ser. No. 690,861, it has been proposed to provide in the nozzle body, insert pieces of highly corrosion-resistant, non-metallic materials for those parts which determine the configuration of the nozzle slot.

The present invention has as an object, the provision of a nozzle for the drawing of plate glass, which excludes the occurrence of cords and other imperfections for all practical purposes, and yet is simple to make.

The invention contemplates a nozzle of the character described above, which is characterized by the addition, to a nozzle body of chamotte, of insert liners conformed to the shape of the nozzle slot and extending over its entire useful length, said insert liners being constituted of highly corrosion-resistant sintered material, preferentially on the basis of silicides of the transition metals.

It has been found that the utilization of sintered materials results in improved quality of the drawn plate glass, and that the aforesaid imperfections, especially cords, are substantially eliminated. In addition, a remarkable advantage of increased service life of the nozzles is also obtained. On account of the extraordinarily smooth and corrosion-resistant surface of the facet material according to the invention, any incipient crystallization, and thereby all formation of cords and streaks in the ribbon of drawn glass is prevented.

Sintered materials suitable for this purpose are oxides, carbides, nitrides, borides, or silicides of the transition metals, especially molybdenum disilicide. The arrangement of the liner inserts of sintered material is limited to the facet area forming the two lips of the nozzle slot.

DETAILED DESCRIPTION

Figure 1:
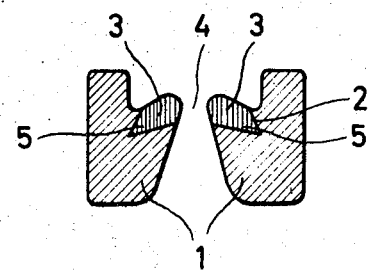
FIG. 1 is across-sectional view of a nozzle according to the invention with liner inserts arranged in the facet area.
Figure 2:
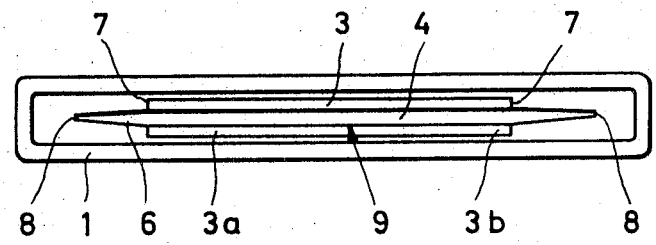
FIG. 2 is a plan view of the nozzle according to FIG. 1.
Figure 3:
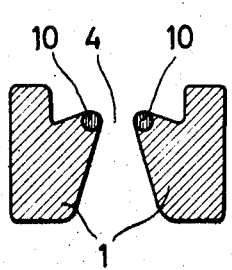
FIG. 3 is an embodiment somewhat modified from that of FIG. 1.

Reference number 1 designates in FIGS. 1–3 a nozzle body constituted of conventional nozzle chamotte material. In the embodiment of FIG. 1, a recess of approximately wedge-like shape 2 has been provided in the body 1 in spaced lips thereof, into which liner inserts 3 of a highly corrosion-resistant, non-metallic sintered material have been seated. The inserts 3 are located in the facet region of the lips and bound a nozzle slot through which molten glass is extracted for drawing. The portions 5 of the inserts 3 have a wedge-shaped cross-section and are lodged in the correspondingly shaped portion of the recess 2 to prevent any lifting-off of said liners by the band of molten glass moving upwards through the nozzle slot 4 (glass not shown).

In FIG. 2 there can be seen the tapered ends 6 of the slot. These slot ends are relatively short so that the joints 7 between the end faces of the liner inserts 3 are spaced no more than 20 cm. from the end of slot 4. In the embodiment shown in FIG. 2, the liner insert 3 shown in the upper section of the figure is one integral piece. The liner insert shown in the bottom half of the figure consists of two contiguous elements 3a and 3b in abutment at a joint 9. Elements 3a and 3b may be plane-ground and dry-joined at their contact surfaces. However, the joint 9 can also be a gap which is filled with a cement mortar which is sintered in situ and the joint subsequently equalized by grinding. The cement used for this purpose has properties approximately identical to that of the material of the liner inserts 3.

In the embodiment shown in FIG. 3, each of the liner inserts 3 is constituted as a single piece of rod or tube section 10. The rod or tube sections 10 are constituted of the sintered material.

It should be noted that the nozzle according to the invention in its various embodiments is heavier than conventional chamotte nozzles, since the material used for making portions of the nozzle has a relatively high specific gravity. Consequently, when the nozzle according to the invention is used for drawing glass from the melt, it does not float on same, and need not be pressed downward at the beginning of the drawing operation, as is often necessary with simple chamotte nozzles, but must be suspended at the approximate elevation of the melt level.

What is claimed is:

1. A nozzle for drawing plate glass, said nozzle comprising a chamotte nozzle body having opposed frontal walls defining an elongated slot through which molten glass is extracted for drawing, said slot having tapered ends, said frontal walls being inclined towards an outlet such that the slot narrows in the direction of glass travel, said nozzle body having upwardly facing surfaces at said outlet, and insert pieces supported by the nozzle body in a restricted region at the outlet of the slot, said insert length thereof between the tapered ends, said nozzle body having elongated recesses in which said insert pieces are received said recesses having bounding flanks which intersect in V-shaped manner, said insert pieces having a wedge-shaped cross-section corresponding to the V-shaped recesses to engage therein, one flank of each recess extending tranversely from an associated frontal wall of the nozzle body towards the line of intersection of said flanks, the other flank extending upwardly from said line of intersection to the upwardly facing surface of the nozzle body, said other flank being tilted to overlie said one flank a distance sufficient that said other flank exerts a downward retaining force on said insert piece to resist lifting of the insert piece by the flow of molten glass, the insert pieces being shaped to smoothly blend with said frontal walls to cause the material to be removed from the slot free of surface imperfections, said insert pieces being constituted of sintered molybdenum disilicide, which is non-metallic and highly corrosion-resistant.

2. A nozzle according to claim 1, wherein the insert piece for each nozzle wall is composed of a plurality of contiguous elements, and means connecting the elements together and constituted as burnt-in cement mortar forming a joint between contiguous elements, said cement mortar having properties similar to those of the sintered material of the liner inserts.

References Cited

UNITED STATES PATENTS

| 1,593,566 | 7/1926 | Byrnes | 65—344 |
| 1,701,899 | 2/1929 | Spinasse | 65—344X |
| 1,739,936 | 12/1929 | Allen et al. | 65—344 |

OTHER REFERENCES

Engineering Props. of Selected Ceramic Mat'ls, compiled by Battelle Memorial Institute, Columbus Labs, Columbus, Ohio, published by the American Ceramic Society, 1966, pp. 5,7,0–1 and 5,7,0–2.

HOWARD R. CAINE, Primary Examiner

S. R. FRIEDMAN, Assistant Examiner

U.S. Cl. X.R.

65—338, 374